United States Patent Office 3,148,115
Patented Sept. 8, 1964

3,148,115
POTENTIATION OF TUMOR-GROWTH INHIBITION FROM DEOXYPYRIDOXINE, TESTOSTERONE, OR 6-MERCAPTOPURINE, BY 6-AMINONICOTINAMIDE
Willard J. Johnson, Laval-des-Rapides, Quebec, and John Duncan McColl, Dorval, Quebec, Canada, assignors to Frank W. Horner Limited, Montreal, Quebec, Canada
No Drawing. Filed Dec. 8, 1958, Ser. No. 778,611
3 Claims. (Cl. 167—65)

This invention relates to a process for inhibiting the growth of certain tumors in animals. More particularly it relates to the in vivo treatment of animals afflicted with certain tumors. This application is a continuation in part of our copending application for United States Letters Patent Serial No. 616,927, filed October 19, 1956, now abandoned.

It is an object of the present invention to provide an efficacious method of treating animals afflicted with certain tumors in order to effect an inhibition in the growth of such tumors.

It is a further object of the present invention to provide a novel composition of matter which may be administered to animals afflicted with certain tumors in order to effect an inhibition in the growth of such tumors.

In accordance with the present invention the desired inhibition in the growth of certain tumors is achieved by selecting an animal afflicted with such tumor and administering to such animal a composition comprising 6-aminonicotinamide, either alone or in combination with an antimetabolite selected from the group consisting of 8-azaguanine, 6-thioguanine, 6-chloropurine, 6-mercaptopurine, deoxypyridoxine, azaserine (O-diazoacetyl-L-serine) and 5-fluorouracil, this combination of 6-aminonicotinamide and antimetabolite being used either alone or in further combination with an agent selected from the group consisting of testosterone and 6-formylpteridine, in amounts sufficient to effect an inhibition in the growth of the tumor.

When used in this application the term "antimetabolite" is used in connection only with the metabolic processes in mammals. Furthermore, the term "antimetabolite" as used in this specification embraces the following two definitions, which illustrate clearly what a biochemist means by the term "antimetabolite."

(1) Robert S. Goodhart in "Symposium on the Antimetabolites—Their Modes of Action and Therapeutic Implications," the National Vitamin Foundation, Inc., New York, 1955, page 1: "An antimetabolite is an inactive compound sufficiently similar in structure to an essential metabolite so as to tend to replace it in biological systems, thus bringing about a 'conditioned' deficiency of the metabolite."

(2) D. W. Wooley—A Naturally Occurring Antimetabolite of Methionine in the Causation of a Disease, in "Symposium on the Antimetabolites—Their Modes of Action and Therapeutic Implications," the National Vitamin Foundation, Inc., New York, 1955, page 35, and "A Study of Antimetabolites," John Wiley, New York, 1952: "Such a compound (an antimetabolite) is a structural analogue of some vitally essential component of living things. However, the structural analogy does not, of itself, make a compound an antimetabolite. In addition, the analogue must be able to antagonize the action of the metabolite. In other words, it must be able to exclude its related essential metabolite from the specific cellular reactions for which the latter is designated. A deficiency of this essential metabolite is thereby created. The antimetabolite competes with the metabolite when the latter is serving as a substrate in an enzymic or semienzymic reaction. Because it preferentially attaches to the enzyme it is able to prevent the formation of the normal product of the reaction. In this way the deficiency is produced. The structural analogy of the antimetabolite to the metabolite is presumably what allows it to make this attachment. Being so nearly like a metabolite, the antimetabolite fits into the specific receptor of the enzyme, much as the metabolite itself does."

6-aminonicotinamide is a structural analogue of nicotinamide differing from it only by an amino group in the 6-position.

When 6-aminonicotinamide was administered to rabbits it was found to be highly toxic. However, it was later found that the lethal toxicity of 6-aminonicotinamide could be blocked by administration of nicotinamide.

The concurrent administration of nicotinamide in doses ranging from 12.5 to 50 mg./kg. body weight has been found to provide increasingly greater protection against the lethal toxicity of 6-aminonicotinamide. The results are shown below in Table A.

TABLE A

Effect of Metabolite on the Median Lethal Dose ($LD_{50}$) of 6-Aminonicotinamide

| Metabolite [1] | Dose, mg./kg. | Species and number of animals | 6-aminonicotinamide $LD_{50}$ (mg./kg.) [2] | 95% Fiducial Limits |
|---|---|---|---|---|
| None | | Mouse (30) | 35 | 33–37 |
| Nicotinamide | 12.5 | | 64 | 35–77 |
| | 25 | | 121 | 113–129 |
| | 50 | Mouse (30) | 308 | 291–331 |
| Nicotinic Acid | 25 | Mouse (70) | 70 | 64–80 |
| L-Tryptophan | 250 | Mouse (30) | 62 | 44–87 |
| None | | Rat (20) | 11 | 9–13 |
| None | | G.P. (20) | 10 | 8–14 |

[1] Metabolite and 6-aminonicotinamide administered intraperitoneally simultaneously. Mice: CF1 strain, 18–22 gm. Rats: Sprague-Dawley, 150–160 gm. All animals were kept on a nutritionally adequate diet.
[2] $LD_{50}$ and fiducial limits calculated by the probit method from mortalities occurring over a 30-day period.

Thus as seen from the above table, when 50 mg./kg. of nicotinamide is administered, the $LD_{50}$ of 6-aminonicotinamide is increased to 308 mg./kg., which is 6 times the $LD_{100}$ of 6-aminonicotinamide when given alone. Nicotinic acid gives less protection than nicotinamide since it must first be converted to the amide in vivo to exercise its effect. Tryptophan, a precursor of nicotinic acid, also gives significant protection.

It was also found that toxicity symptoms are reversible if treatment with nicotinamide is begun in time. When 6-aminonicotinamide was fed to rats at 25 mg./kg. of diet, toxic symptoms, including paralysis, appeared in 5 to 6 days. The addition of nicotinamide, 250 mg./kg. of diet, to the regimen after the appearance of toxic symptoms resulted in the rapid disappearance of the symptoms. Similarly, nicotinamide at 150 mg./kg. of diet prevented completely the growth inhibition and toxicity symptoms in rats of 6-aminonicotinamide administered in the diet at 15 mg./kg. The fact that nicotinamide administration provides complete protection against the lethal toxicity of 6-aminonicotinamide, as shown in the above examples, is proof that the latter is an antimetabolite of nicotinamide.

The nature of the effects of 6-aminonicotinamide administration suggested that the activity of the compound was contingent upon metabolic transformation in vivo, probably by incorporation into pyridine nucleotides (DPN and TPN) in place of nicotinamide to give the corresponding 6-aminonicotinamide analogue of DPN and TPN. The formation of such analogues of pyridine nucleotides could exert a toxic effect by inhibiting the numerous enzymic reactions in which one or other of the pyridine nucleotides functions as a coenzyme by competing with the latter for active sites on the enzyme. Interference with pyridine nucleotide metabolism in this manner would be expected to have a profound effect on the overall metabolism of tissues since most metabolic reactions are directly or ultimately DPN or TPN dependent. The 6-aminonicotinamide analogue of DPN was isolated from the tissues of rabbits, mice and rats, which had been treated with 6-aminonicotinamide, and also from neoplastic tissue of rats bearing Walker carcinosarcoma 256. The 6-aminonicotinamide analogue of DPN has been found to be inactive as a coenzyme in biochemical reactions which require DPN, and moreover, it acts as an inhibitor of such reactions.

Cancer tissues are generally deficient in pyridine nucleotides (DPN and TPN). Total DPN content of solid tumors is very much lower than that of most normal tissues and total TPN content is very low or negligible. This quantitative difference between cancer and normal tissue with respect to pyridine nucleotides suggested the possibility that tumors may be more susceptible to the toxic effects of 6-aminonicotinamide than normal tissues of the host.

The following examples are given to show the tumor-inhibiting effects of the compositions of the present inventions.

EXAMPLE I—EFFECT ON MAMMARY ADENOCARCINOMA 755

C57 black mice, weighing about 20 grams were used throughout this test. Tumor tissues were homogenized in saline in the proportion of 1:1 w./v. and the transplant was made every 14 days by injecting 0.5 ml. of the homogenate into the thigh muscle of the recipient mouse, using a large inoculum method, as disclosed by Talalay et al., "Cancer Research," 13,556 (1953). All transplants for any one test were made, intraperitoneal injections were begun on 4–7 day old tumors, and the test was continued for 6 days. On the last day, all animals were killed, and the tumors weighed. The results are shown in Table I.

TABLE I

| Group | Dose, mg./kg. | No. of Daily Injections | Av. Tumor wt., mg. S.E. | No. of Dead Animals, Dead/Total |
|---|---|---|---|---|
| Control | | | 109±18 | 0/19 |
| 6AN | 2.0 | 8 | 17±4 | 0/20 |
| 6AN | 1.5 | 8 | 60±17 | 0/20 |
| Control | | | 275±39 | 0/20 |
| 6AN | 2.0 | 6 | 40±13 | 0/20 |
| 6AN | 1.5 | 6 | 78±23 | 0/20 |
| Control | | | 2,211±203 | 2/19 |
| 6AN | 3.0 | 6 | 330±38 | 0/20 |
| 6AN | 2.0 | 6 | 670±63 | 0/20 |

It is seen from the above table that 6-aminonicotinamide (throughout this specification 6AN stands for 6-aminonicotinamide) is effective in inhibiting the growth of 4–7 day old mammary adenocarcinoma 775 grown in C57 black mice. It seems to be more effective with higher doses of 6-aminonicotinamide.

Example I, above, demonstrates the tumor inhibiting effects of 6-aminonicotinamide. It was stated hereinabove that 6-aminonicotinamide is an antimetabolite of nicotinamide. Further proof of the metabolite: antimetabolite relationship is shown by the following table B, which shows that the antitumor effect of 6-aminonicotinamide is reversed by concurrent nicotinamide administration.

TABLE B

*Reversal of Carcinostatic Effect of 6-Aminonicotinamide by Nicotinamide*

| Group | Injection Begun [4] | Mean Tumor wt.±S.E. (mg.) | No. Animals Dead/Total |
|---|---|---|---|
| Saline | 7 | 275±39 | 0/20 |
| 6AN [1] | 7 | 40±13 | 0/20 |
| Nic [2] | 7 | 184±27 | 0/20 |
| 6AN+Nic [3] | 7 | 239±30 | 0/21 |
| Saline | 14 | 2,211±203 | 0/19 |
| 6AN [1] | 14 | 670±63 | 0/19 |
| Nic [2] | 14 | 2,078±69 | 0/19 |
| 6AN+Nic [3] | 14 | 2,198±252 | 0/20 |
| Saline | 7 | 219±29 | 0/19 |
| 6AN [1] | 7 | 51±7 | 0/19 |
| Nic [2] | 7 | 180±23 | 0/19 |
| 6AN+Nic [3] | 7 | 192±33 | 0/20 |

[1] 6AN-6-aminonicotinamide administered intraperitoneally at a dose of 2 mg./kg. once daily for 6 injections.
[2] Nic-Nicotinamide administered intraperitoneally at a dose of 100 mg./kg. once daily.
[3] Nicotinamide was administered intraperitoneally at a dose of 100 mg./kg. followed by 6-aminonicotinamide at a dose of 2 mg./kg. 15 minutes later, once daily.
[4] Number of days after transplantation injections begun. Tumor is the mammary adenocarcinoma 755.

EXPERIMENT II—EFFECT OF 6AN ON WALKER TUMOR-BEARING RATS

Sprague-Dawley rats, weighing about 120 grams, were used throughout this test. Tumor tissues were homogenized in saline in the proportion of 1:1 w./v. and the transplant made every 14 days by injecting 0.5 ml. of the homogenate into the thigh muscle of the recipient rat, using the hereinbefore outlined large inoculum method under sterile conditions. All transplants were made from one donor tumor.

This technique produced rapidly growing tumors with a uniformly high proportion of "takes." The tumors were grown intramuscularly because, in this location, the outline of the tumor could be fairly closely delineated, and measurements were reasonably accurate.

Tumor dimensions were measured in two directions at right angles to each other, using calipers. The readings were multiplied together to give a simple but reproducible function of the tumor size, which was expressed as sq. cm./100 gm. body weight.

Tumor dimensions and body weight were recorded periodically during the test. Each test was terminated 10 days after the transplant of the tumor cells, and on the last day all animals were killed and the organs weighed. Normal non-tumor-bearing rats were similarly treated and served as controls.

The effects of the following treatments were compared:

(a) 6-aminonicotinamide (6AN) at dose level of 0.5 mg./kg./day and 0.75 mg./kg./day administered subcutaneously. This compound was administered at the same time as the transplant in one series of tests, and two days prior to the transplant on another series of tests, and continued daily thereafter.

(b) 6-mercaptopurine (6MP) at a dose of 10 mg./kg./day administered subcutaneously two days prior to the transplant and continued daily thereafter.

(c) Cortisone aceate at a dose of 15 mg./kg./day subcutaneously administered two days prior to transplant and continued daily thereafter.

The results are summarized in Table II:

TABLE II

| Treatment | When Begun | Tumor, cm.²/100 g. ± S.E.M. | Weight Change, gm. ± S.E.M. | Mortality Dead/Total |
|---|---|---|---|---|
| Absolute Control | | | +38±2.0 | 0/10 |
| Walker Tumor Control | | 6.5±0.5 | +85±5.6 | 0/10 |
| 0.5 mg./kg. 6AN | 2 days prior simultaneous. | 4.1±0.7 / 6.5±0.6 | +2±9.5 / +36±8.7 | 0/10 / 0/10 |
| 0.75 mg./kg. 6AN | do | 4.4±0.5 / 4.3±0.7 | −20±3.7 / −7±9.6 | 0/10 / 0/10 |
| 10 mg./kg. 6-mercaptopurine | 2 days prior | 4.8±0.9 | −31±6.7 | 0/10 |
| 15 mg./km. Cortisone | do | 6.2±0.6 | +19±3.0 | 1/10 |

These results show that 6-aminonicotinamide is effective, at fairly low dosages, in inhibiting the growth of Walker carcinoma 256 in Sprague-Dawley rats. At lower dosages 6-aminonicotinamide is not effective when administered simultaneously with the tumor transplant, but is effective when pretreatment occurs two days prior to the tumor transplant. At higher dosages it is effective also when administered simultaneously.

The table also shows that 6-mercaptopurine also inhibits the growth of such tumor, but that cortisone has no significant effect.

EXAMPLE III—EFFECT OF VARIOUS COMBINATIONS ON MAMMARY ADENOCARCINOMA 755

Mammary Adenocarcinoma 755 was grown on C57 black mice as described in Example I. The tumors were permitted to grow for fourteen days, and the compositions were injected intraperitoneally.

The following combinations of agents were tested:

(a) 8-azaguanine+testosterone (abbreviated 8A+T) injected once daily.

(b) 8-azaguanine+testosterone+deoxypyridoxine (abbreviated 8A+T+D), the 8-azaguanine and testosterone being injected once daily, while the deoxypyridoxine is injected twice daily at a four hour interval.

(c) 8-azaguanine+testoterone+6-aminonicotinamide (abbreviated 8A+T+6AN) injected once daily.

(d) 8-azaguanine+testosterone+deoxypyridoxine+6-aminonicotinamide (abbreviated 8A+T+D+6AN), the 8-azaguanine, testosterone and 6-aminonicotinamide being injected once daily, while the deoxypyridoxine is injected twice daily at a four hour interval.

The results are summarized in Table III:

nicotinamide was effective in reducing the tumor growth (see tests numbered 5 and 10).

Not all antimetabolites are effective in combination with 6-aminonicotinamide in achieving the advantages of the present invention. It has been found that the use of 6-aminonicotinamide in combination with antimetabolites which themselves show antitumor activity results, suprisingly, in an effect which is more than the sum of the individual effects of the 6-aminonicotinamide and the antimetabolite when used alone. This has been shown in Examples II and III, hereinabove. Suitable antimetabolites for use in the present invention include: purine antagonists, namely, 8-azaguanine, 6-mercaptopurine, 6-chloropurine, 6-thioguanine, and azaserine; deoxypyridoxine, a pyridoxine antagonist; and 5-fluorouracil, a pyrimidine antagonist.

Suitable auxiliary agents which may be used in conjunction with the combination of 6-aminonicotinamide and the specific antimetabolite or antimetabolites include: cortisone, testosterone, and 6-formylpteridine.

Tumors which may be inhibited by carrying out the process of the present invention include: Mammary adenocarcinoma 755, Walker carcinosarcoma 256, C₃H mammary adenocarcinoma, the lymphosarcoma 6 C₈HED.

As disclosed hereinabove, the compositions of the present invention comprise 6-aminonicotinamide either alone or in combination with certain antimetabolites, and in further combination with both the antimetabolites and auxilary agents. Examples of suitable compositions include: 6-aminonicotinamide and 6-mercaptopurine, in a ratio of between 1:10 and 1:1000; 6-aminonicotinamide in combination with 8-azaguanine, in a ratio of between 1:10 and 1:1000; 6-aminonicotinamide in combination with deoxypyridoxine in a ratio of between 1:10 and 1:1000; 6-aminonicotinamide in further combination with 8-azaguanine and testosterone, in a ratio of between 1:10 and 1:1000 of the 6-aminonicotinamide to the other active ingredients; 6-aminonicotinamide in further combination with deoxypyridoxine and testosterone in a ratio of between 1:10 and 1:1000 of the 6-aminonicotinamide to the other active ingredients.

Although the dose of the 6-aminonicotinamide, or the combination of 6-aminonicotinamide with the specific antimetabolite, or the further combination of 6-aminonicotinamide, specific antimetabolite and auxiliary agent, administered to animals may vary widely in accordance with the weight of the animal, it has been found that a daily dose of 0.2–4 milligrams per kilogram of body weight is satisfactory. The composition of the present

TABLE III

| Group | Dose in mg./kg. | Test No. | No. of Daily Injections | Av. Tumors, Wt. mg.± S.E. | No. of Animals Dead/Total | Percent Host Wt. Change |
|---|---|---|---|---|---|---|
| Sacrifice Control | | 1 | | 236±34 | 0/19 | +5 |
|  | | 6 | | 370±56 | 0/19 | +7 |
| 8A+T | 50.0+25 | 2 | 6 | 490±48 | 0/20 | +9 |
|  | | 7 | 6 | 563±70 | 0/18 | +9 |
| 8A+T+D | 50+25+30 respectively | 3 | 6 | 367±41 | 0/19 | +5 |
|  | | 8 | 6 | 360±39 | 2/20 | +4 |
| 8A+T+6AN | 50+25+0.85 respectively | 4 | 6 | 356±34 | 0/20 | +9 |
|  | | 9 | 6 | 354±36 | 0/20 | +7 |
| 8A+T+D+6AN | 50+25+30+0.85, resp. | 5 | 6 | 226±34 | 0/20 | +6 |
|  | | 10 | 6 | 290±26 | 1/20 | +8 |

This table shows the beneficial inhibiting effect of the combination of 6-aminonicotinamide with antimetabolites and with both antimetabolite and auxiliary agents. Thus it is seen that the combination of 8-azaguanine with testosterone is essentially ineffective in inhibiting the tumor growth (see tests Nos. 2 and 7) while the combination of 8-azaguanine, testosterone and deoxypyridoxine was somewhat successful in slowing the growth of the tumor (see tests Nos. 3 and 8) but that the combination of 8-azaguanine, testosterone, deoxypyridoxine and 6-aminoinvention may suitably be administered orally in the form, for example, of tablets each containing about 5–50 milligrams of the active components, i.e. 6-aminonicotinamide, or the combination of 6-aminonicotinamide and the specific antimetabolite, or the further combination of 6-aminonicotinamide, the specific antimetabolite and the auxiliary agent. Generally useful results, evidenced by the decrease in weight of the tumor, appear within about 6 days.

The novel composition for effecting the method of the present invention contains the 6-aminonicotinamide or its salts, either alone or in combination with certain specific antimetabolites, or in further combination both with the certain specific antimetabolites and auxiliary agents, as association with a pharmaceutical carrier, which may be solid or a liquid. Examples of suitable salts of the 6-aminonicotinamide include the hydrochloride, sulfate, hydrobromide, citrate and tartrate. The active substance is effective when given by any of the common routes of administration. (In this specification the term "active substance" is taken to mean that part of the carrier-containing composition which consists of either 6-aminonicotinamide alone or in combination with specific antimetabolites, or in further combination with both specific antimetabolites and auxiliary agents.)

As stated hereinabove the amounts of active substance administered depends upon conditions and factors well known to specialists in the field, such as, the metabolism of the animal, the amount and condition of the tumor, etc. Furthermore, the relative proportions of 6-aminonicotinamide to antimetabolite to auxiliary agents is important in determining the dosage used. The proportion of the active substance to carrier will, of course, depend upon such factors as the nature of the carrier.

Preparations for oral ingestion can be liquid or solid, or combinations of these forms, such as, solutions, suspensions, syrups, elixirs, emulsions, powders or tablets. Pharmaceutical preparations for administration of the active substance in units can take the form of compressed powders or a powder enclosed in a suitable capsule of absorbable material, for example, gelatin. Compressed powders or tablets can take the form of admixtures of the active substance with suitable excipients and/or diluents, for example, starch, lactose, stearic acid, magnesium stearate, cocoa butter, methylcellulose, carboxymethylcellulose, tragacanth, pectin or dextrin.

One preferred form of the invention involves employing the active substance in association with an aqueous medium in sterile form suitable for administration by injection. If desired, organic solvents can be used, as well as water, to provide solutions of the active substance suitable for parenteral injection. Propylene glycol and hexenylglycol, for example, have a very low degree of toxicity and so are perfectly safe for use. Since glycols possess a marked degree of viscosity, an appreciable portion of water may be used to decrease the viscosity. For example, 6-aminonicotinamide dissolves in 50% propylene glycol to give a stable solution of 15 mg./cc. Such solutions may be injected intramuscularly.

The following examples are given by way of illustration of some typical compositions of the present invention and are not to be regarded as limitations of this invention, many variations of which are possible without departing from the spirit or scope thereof.

EXAMPLE IV—INJECTION SOLUTION CONTAINING 15 MG./CC. 6-AMINONICOTINAMIDE

A solution was prepared by dissolving 15 g. of 6-aminonicotinamide and 0.1 g. thiomersal in 50% propylene glycol. This solution was distributed into 5 cc. multidose vials, and then sterilised by heating in an autoclave at 20 lbs. steam pressure per square inch for 20 minutes. This solution was suitable for injection intramuscularly.

EXAMPLE V—TABLETS CONTAINING 25 MG. 6-AMINONICOTINAMIDE

The following ingredients were passed through a #100 mesh (USP) sieve, and mixed together; 250 gm. 6-aminonicotinamide, 120 gm. wheat starch and 1000 gm. lactose. A granulating solution containing 15 gm. gelatin and 15 gm. glycerin dissolved in a mixture of 90 cc. distilled water and 45 cc. alcohol was prepared. The mixed powders were formed into granules by methods well known in the art and then dried. 15 gm. magnesium stearate and 120 gm. wheat starch were added to the dried granules, and the whole mixture compressed into tablets each weighing 153 mg. The tablets were suitable for oral administration.

EXAMPLE VI—TABLETS CONTAINING 12.5 MG. 6-AMINONICOTINAMIDE

A similar composition to that described in Example V was prepared using 125 gm. 6-aminonicotinamide, 120 gm. wheat starch and 1125 gm. lactose.

EXAMPLE VII—TABLETS CONTAINING 5 MG. 6-AMINONICOTINAMIDE

A similar composition to that described in Example V was prepared using 50 gm. 6-aminonicotinamide, 120 gm. wheat starch and 1200 gm. lactose.

6-aminonicotinamide has been used, following the teachings of the present invention, at Presbyterian-St. Luke's Hospital in Chicago, Illinois, on four patients with metastatic carcinoma of the breast. On two of them there has been a dramatic relief of osseous pain. Both of these patients had very extensive osseous metastasis, one with a soft tissue lesion that reduced 2.5 to 1 cm. following therapy.

At Presbyterian-St Luke's Hospital in Chicago, 26 patients have so far been treated with 6-aminonicotinamide following the teachings of the present invention. Regressions have been noted in 4 patients. 19 of the 26 patients had disseminated breast carcinoma and all 4 regressions were noted in breast cases. However, 4 out of 19 regressions is not a true incidence because many of the initial patients treated had very advanced disease. The therapy was started primarily to determine toxicity in humans of 6-aminonicotinamide. In general most of the regressions have been soft tissue regressions. However, at least one patient had re-calcification of previous osteolytic lesions.

Other researchers, following the teachings of the present invention, have confirmed the utility of the compositions disclosed herein. Among these independent confirmations of the utility of the present invention, the following are noteworthy:

(1) Daniel M. Shapiro et al., "Quantitative Biochemical Differences Between Tumor and Host as a Basis for Cancer Chemotherapy V. Niacin and 6-Aminonicotinamide," Cancer Research, vol. 17, No. 6, pp. 600–609, July 1957, which shows:

(a) The effect of 6-aminonicotinamide on mammary adenocarcinoma 755;
(b) The tumor regression using 6-aminonicotinamide+ 8-azaguanine+testosterone.

(2) Fed. Proc. 16:190, 1957, which indicates that 6-aminonicotinamide adversely affects Walker Carcinoma 256, Mammary adenocarcinomas 755 and $J_3(C_3H)$, two mouse gliomas and lymphosarcoma $6C_3HED$; and (3) Dr. F. P. Herter et al., "Initial Clinical Experience With 6-Aminonicotinamide," Proceedings of the American Association for Cancer Research, April 1958, which is abstracted in Proceedings of the American Association for Cancer Research, p. 292 and p. 307, April 1958, in the following terms:

6-aminonicotinamide (6-AN), a nicotinamide antagonist, has demonstrated potent activity against a number of experimental tumors, including the 755 mouse mammary carcinoma, the $C_3H$ mammary adenocarcinomas, the Walker carcinoma 256 in rats, and the lymphosarcoma 6C3HED. Tumor inhibition by 6-AN has been augmented by combination with 8-azaguanine and testosterone. Recently, even greater antitumor effects, including apparent "cures" by combining 6-aminonicotinamide, 6-mercaptopurine, and external radiation have been reported.

Toxicity studies have been carried out elsewhere in mice, rats, guinea pigs, and dogs, and are now being pursued in monkeys. In toxic doses, the drug produces anorexia and weakness, followed by hind quarters paralysis, coma, and death.

Initial clinical studies with 6-AN upon patients suffering from advanced, incurable cancer will be reported. A variety of solid tumors have been represented. Preliminary laboratory work pertaining to hematopoietic, renal, and hepatic systems have been obtained in all patients, and repeated at termination of drug administration. Symptoms of mild toxicity, in the form of headache, nausea, and vomiting, have been noted in some patients at 1 mg./kg., 1.2 mg./kg., and 1.5 mg./kg. These symptoms have disappeared on cessation of the drug. Aside from the above, no neurological changes have been noted as yet, and no alterations in hematopoetic, renal, or hepatic function observed. These studies are continuing at the present time. Therapeutic effects have not yet been noted, but a maximum cumulative tolerated dose has not yet been established. Radiotherapy will be given concurrently with 6-AN, and observations upon cancer patients receiving such treatment will be reported.

(4) Daniel S. Martin et al., "Radiotherapy and Adjuvant Combination Chemotherapy (6-Aminonicotinamide and 6-Mercaptopurine)," Cancer Research, vol. 18, No. 8, 1958, which reports on the use of the combination of 6-aminonicotinamide and 6-mercaptopurine following the teachings of the present invention, as well as Martin's new technique of the use of the present invention in conjunction with radiotherapy. The authors report the results in the following terms:

MATERIALS AND METHODS

"Male C57BL mice, 2–4 months old and weighing 18–25 gm., were housed in plastic cages in an air-conditioned, constant-temperature room (74° F.) and received a diet of Rockland pellets and water," ad libitum. Mammary adenocarcinoma 755 was transplanted into the subcutaneous tissue of the left hind leg of each animal. These implants were allowed to grow for 17 days, at which time they were well established and of good size. Each animal was palpated to ascertain the presence of a tumor, and those not demonstrating a palpable tumor were eliminated. With reference to a table of random numbers, the animals were then separated into groups of approximately twenty animals each, and appropriate treatment was initiated.

Thus, beginning on the 17th day after tumor transplantation, all animals receiving chemotherapy, alone or in conjunction with radiotherapy, were treated once daily for 5 consecutive days. 6-mercaptopurine (6-MP), as a slightly alkaline solution at a dose of 20 mg./kg. daily, and 6-aminonicotinamide (6-AN), in saline, at a dose of 2 mg./kg. daily, were administered intraperitoneally. All animals receiving radiotherapy, alone or in conjunction with chemotherapy, were treated over the same 5-day period and received a total tissue dose of 5,300 r., given in three equal doses on the 1st, 3d, and 5th treatment days. During the X-ray therapy the animals were encased in a lead (¼ inch) box from which only the tumor-bearing hind leg protruded. This box was placed in a specially constructed mount with a 1-cm. cone to which the tumor was centered. The mount was attached directly to the master cone of an X-ray unit delivery 785 r. tumor dose/min. Factors were 120 kv.; target-skin distance, 8 cm.; HVL=0.7 mm. Al.

Following the 5-day treatment period, the animals were observed for from 33 to 38 days (50–55 days after tumor transplantation). The animals were then sacrificed, and all tumors which had not undergone complete regression were dissected free and weighed to the nearest milligram. All abnormal tissue, no matter how small in amount or equivocal as to etiology or viability, was recorded as residual tumor, removed, and weighed.

Throughout the course of each experiment the tumors in each group were palpated at regular intervals, and a drawing of the estimated size and shape was recorded on a chart assigned to each animal.

For each experiment a group of animals labeled "sacrificed controls" was sacrificed on the day treatment of the other animals was initiated, to provide a base line for measuring objectively the effect of treatment in the other groups.

RESULTS

The results of two representative experiments (from a total of five) are shown in Table 1. Animals that died during the course of each experiment are divided into two categories: "Dead of tumor" and "Dead of treatment." "Dead of tumor" includes those animals dying as a result of large tumor size and/or ulceration with hemorrhage, and "Dead of treatment" includes all animals not dying as a result of large tumor and presumed dead of drug toxicity. "Complete Regression" refers to those tumors which had completely disappeared by the day of sacrifice, and for the time of observation these represent "cures." The percentage of such "cures" in reference to the total number of animals in each group is indicated. The average tumor weight and standard error were determined for each group on the day of sacrifice.

TABLE 1

*Radiotherapy+Adjuvant Combination Chemotherapy*

[Two Representative Experiments]

| Group [1] | Total | No. Animals Dead of Tumor | Dead of Treatment | No. Tumors Complete Regression Total | Percent "Cures" | Av. Tumor Wt. (mg.) | Percent Wt. Change (Host + Tumor) |
|---|---|---|---|---|---|---|---|
| Sac. cont. | 17 | | | | | 165±36 | |
| Untreated cont. | 19 | 18 | 0 | 0/19 | 0 | 1,890 (1 tumor) | +15 |
| 6–AN+6–MP | 19 | 15 | 0 | 2/19 | 10 | 428±189 | +11 |
| X-ray | 19 | 4 | 0 | 7/19 | 37 | 173±89 | +8 |
| 6–MP+X-ray | 19 | 0 | 0 | 10/19 | 53 | 113±83 | +9 |
| 6–AN+X-ray | 19 | 1 | 0 | 8/19 | 42 | 241±123 | +10 |
| 6–MP+6–AN+X-ray | 19 | 6 | 0 | 17/19 | 89 | 8±8 | +7 |
| Sac. cont. | 20 | | | | | 98±29 | |
| Untreated cont. | 19 | 18 | 0 | 0/19 | 0 | 2,836 (1 tumor) | –6 |
| 6–AN+6–MP | 20 | 6 | 0 | 2/20 | 10 | 993±460 | +10 |
| X-ray | 20 | 0 | 0 | 8/20 | 40 | 37±14 | +6 |
| 6–MP+X-ray | 21 | 0 | 0 | 6/21 | 29 | 110±74 | +6 |
| 6–AN+X-ray | 21 | 0 | 0 | 12/21 | 57 | 43±30 | +6 |
| 6–MP+6–AN+X-ray | 18 | 0 | 0 | 12/18 | 67 | 18±16 | +8 |

[1] Sac. cont.=animals sacrificed on day injections began to other groups; all treatment was begun 17 days after implantation of mammary adenocarcinoma 755 to C57BL mice. After 5 days of treatment the animals were observed for 33–38 days before termination. 6–AN=6–Aminonicotinamide 6–MP=6–mercaptopurine.

*Untreated.*—As can be noted in Table 1, nearly all the untreated animals were dead of tumor by the end of the 33–38 day observation period (50–55 days after tumor implantation. The tumors from the few surviving animals were large, as can be seen under "Av. tumor wt.," and no tumors regressed spontaneously.

6-MP+6-AN.—Palpation of the tumors in those animals receiving only chemotherapy (i.e., 6–MP+6–AN) indicated, in general, that tumor growth was virtually stopped for the 5-day treatment period and for approximately 5 days thereafter. . . .

X-ray.—The X-ray dose chosen for these experiments was of such a magnitude as to cause considerably less than 100 percent permanent regression of all tumors. Because of biologic variation, the percentage of tumors "cured" with radiotherapy alone ranged among experiments from 0 to 40 percent. Those tumors not "cured" by the X-ray treatment showed transient regression with a slow resumption of growth ("escape"). This "escape" was more delayed than that in the groups receiving only chemotherapy, as indicated by the smaller average tumor weights and the fewer animals dead of tumor.

6–MP+X-ray.—In those groups of animals receiving 6–MP+X-ray the tumors followed a pattern similar to that observed with X-ray alone. The percentage of tumors "cured" with 6–MP+X-ray (25 percent–53 percent), while slightly higher than with X-ray alone (0–40 percent), was of no significant magnitude.

6–AN+X-ray.—The tumors in the groups of animals receiving 6–AN+X-ray also followed a pattern similar to that observed with X-ray alone. The percentage of tumors "cured" with 6–AN+X-ray (21 percent–57 percent) was slightly but not significantly higher than that with X-ray alone (0–40 percent).

6–MP+6–AN+X-ray.—A marked increase in tumor damage resulting from the administration of 6–MP+6–AN+X-ray over that of X-ray alone, both in percent tumor "cures" (37–89 percent) and in average tumor weight, was seen in every experiment. In addition, the percentage of tumors "cured" was significantly greater with both drugs plus X-ray than with either drug alone plus X-ray. According to palpation, none of the tumors in these groups of animals receiving the combined chemotherapy and X-ray had "escape" by the end of the observation period, whereas there were some "escapes" in the groups receiving only one drug+X-ray. This may be more objectively ascertained by comparing the average tumor weights of the groups with those of their respective "sacrificed controls."

A comparison of the average percentage of "cures" for all groups in the five experiments may be represented as follows:

| | Percent |
|---|---|
| No treatment | 0 |
| 6AN+6MP | 9 |
| X-ray | 27 |
| 6MP+X-ray | 35 |
| 6AN+X-ray | 40 |
| 6MP+6AN+X-ray | 63 |

In addition, the toxicity of 6-aminonicotinamide in man has now been determined at the Francis Delafield Hospital in New York city, under the supervision of Drs. Frederic P. Herter, George Hyman, Henry Clay Frick, Charles Findlay, and Danield S. Martin. Thirty patients received daily doses intramuscularly varying in amounts of 0.1 mg. per kg. to 1.5 mg. per kg. per day for fourteen days. Doses of 0.2 mg./kg. or less per day for fourteen days produced no toxicity, whereas doses of 0.4 mg./kg. per day resulted in nausea and headache in most patients. Doses of 1.0 mg./kg. and larger were associated with nausea and vomiting, stomatitis, blapharitis, mental confusion and impaired hearing. All these symptoms disappeared or were ameliorated by discontinuance of the drug and niacin administration.

A relatively non-toxic dose for therapeutic trial in combination with radiotherapy has been established at 0.2 mg./kg. intramuscularly daily for four weeks. Two out of twenty-nine patients on this four week course of therapy developed impaired hearing which was corrected by the use of a hearing aid. Preliminary biochemical data upon tissue from patients receiving this dosage reveals abnormal nucleotides in tumor tissue, thus indicating that this dosage is capable of producing tissue concentrations of 6–AN which may be at appropriate levels for therapeutic effectiveness with radiotherapy.

What we claim is:

1. A method of inhibiting the growth of tumors which comprises: selecting a human afflicted with a tumor; and administering to said human, an amount of a composition comprising a mixture of 6-aminonicotinamide and deoxypyridoxine to provide at least 0.1 mg. of 6-aminonicotinamide per kg. body weight per day.

2. A method of inhibiting the growth of tumors which comprises: selecting a human afflicted with a tumor; and administering to said human, an amount of a composition comprising a mixture of 6-aminonicotinamide, deoxypyridoxine and testosterone to provide at least 0.1 mg. of 6-aminonicotinamide per kg. body weight per day.

3. A method of inhibiting the growth of tumors which comprises: selecting a human afflicted with a tumor; and administering to said human, an amount of a composition comprising a mixture of 6-aminonicotinamide and 6-mercaptopurine to provide at least 0.1 mg. of 6-aminonicotinamide per kg. body weight per day.

References Cited in the file of this patent

Johnson: "The Inhibition of Sulphanilamide Acetylation by Aromatic and Heterocyclic Carboxamides and Carboxyhydrazides," Canadian Journal of Biochemistry and Physiology, vol. 33, No. 2, March 1955, pp. 107–111.

Johnson et al.: "6-Aminonicotinamide—A Potent Nicotinamide Antagonist," Science, vol. 122, No. 3174, Oct. 28, 1955, p. 834.

"Antimetabolites," Annals of the New York Academy of Sciences, vol. 52, Art. 8, July 7, 1950, pp. 1229–1234, 1235–1242, 1302–1317.

Dyer: An Index of Tumor Chemotherapy, U.S. Public Health Service, 1949, p. 169.

Shapiro, D. M.: "Quantitative Biochemical Differences as a Basis for Cancer Chemotherapy," Radiology (Syracuse), vol. 69, No. 2, pages 188–200, August 1957, abstracted in Chem. Abstracts, vol. 51, No. 21, No. 16890f, Nov. 10, 1957.

Baserga et al.: "Hematological and Histological Changes Caused by 6-Aminonicotinamide," Acta Vitaminologica (Milano), vol. 10, No. 5, pages 195–204, October 1956, abstract in English in Chem. Abstracts, vol. 51, No. 8, No. 5994d–e, Apr. 25, 1957.

Shapiro et al.: "Quantitative Biochemical Differences Between Tumor and Host as a Basis for Cancer Chemotherapy," V. Niacin and 6-Aminonicotinamide," Cancer Research (Chicago), vol. 17, No. 6, pages 600–604, July 1957, abstracted in Chem. Abstracts, vol. 52, No. 6, No. 4851a, Mar. 25, 1958.

McColl, Rice and Adamkiewicz: "Inhibition of Walker Carcinoma 256 by 6-Aminonicotinamide," Canadian J. Biochem, and Physiol., vol. 35, No. 10, pages 795–8, October 1957, abstracted in Chem. Abstracts, vol. 51, No. 22, No. 18341f, Nov. 25, 1957.

UNITED STATES PATENT OFFICE
CERTIFICATE OF CORRECTION

Patent No. 3,148,115                                  September 8, 1964

Willard J. Johnson et al.

It is hereby certified that error appears in the above numbered patent requiring correction and that the said Letters Patent should read as corrected below.

Column 3, line 73, for "775" read -- 755 --; column 4, line 73, for "aceate" read -- acetate --; columns 5 and 6, TABLE III, fifth column, line 5 thereof, for "367+41" read -- 367$\pm$41 --; column 9, line 26, before "Male" strike out the opening quotation marks; line 30, after "water," strike out the closing quotation marks; columns 9 and 10, Table 1, third column, line 7 thereof, for "6" read -- 0 --; same table, footnote 1, line 1 thereof, for "began" read -- begun --; same table, footnote 1, line 3 thereof, after "Aminonicotinamide" insert a semicolon; column 10, line 72, for "(50-55" read -- (50-55) --; column 11, line 20, for "tumors "cured with" read -- tumors "cured" with --.

Signed and sealed this 13th day of April 1965.

(SEAL)
Attest:

ERNEST W. SWIDER                                EDWARD J. BRENNER
Attesting Officer                                    Commissioner of Patents